(12) United States Patent
Huang

(10) Patent No.: US 8,552,742 B2
(45) Date of Patent: Oct. 8, 2013

(54) CALIBRATION METHOD FOR RADIO FREQUENCY SCATTERING PARAMETER MEASUREMENTS

(75) Inventor: Chien-Chang Huang, Chung-Li (TW)

(73) Assignee: Yuan Ze University, Taoyuan County (TW)

( * ) Notice: Subject to any disclaimer, the term of this patent is extended or adjusted under 35 U.S.C. 154(b) by 372 days.

(21) Appl. No.: 13/015,326

(22) Filed: Jan. 27, 2011

(65) Prior Publication Data
US 2012/0197577 A1    Aug. 2, 2012

(51) Int. Cl.
G01R 27/04    (2006.01)
G01R 35/00    (2006.01)

(52) U.S. Cl.
USPC .......................................... 324/638; 324/601

(58) Field of Classification Search
None
See application file for complete search history.

(56) References Cited

PUBLICATIONS

Huang C-C, Lin Y-H, Chang-Chien M-Y, Accuracy Improvement for Line-Series-Shunt calibration in broadband Scattering— Parameter Measurements with Applications of On-Wafer Device Characterization, Sep. 2010, IEEE Tansactions on microwave Theory and Techniques, vol. 58 No. 9 pp. 2497-2503.*

Eul H-J, Schiek B, A Generalized Theory and New Calibration Procedures for Network Analyzer Self-Calibration, Apr. 1991, IEEE Transactions on Microwave Theory and Techniques, vol. 39 No. 4 pp. 724-731.*

Chien-Chang Huang, Huan-Che Lin, A Novel Calibration Algorithm with Unknown Line-Series-Shunt Standards for Broadband S-Parameter Measurements, IEEE Transactions on Instrumentation and Measurement, vol. 57, No. 5, May 2008, p. 891-896.

Chien-Chang Huang, Yuan-Hong Lin and Min-Yu Chang-Chien, Accuracy Improvement for Line-Series-Shunt Calibration in Broadband Scattering-Parameter Measurements With Applications of On-Wafer Device Characterization, IEEE Transactions on Microwave Theory and Techniques, vol. 58, No. 9, Sep. 2010, p. 2497-p. 2503.

* cited by examiner

*Primary Examiner* — Melissa Koval
*Assistant Examiner* — Courtney McDonnough
(74) *Attorney, Agent, or Firm* — Ming Chow Sinorica, LLC

(57) ABSTRACT

A calibration method for radio frequency scattering parameter measurements enabling self-calibration, which calibration method using a transmission line segment calibrator, a series device calibrator, a shunt device calibrator and a tested object measuring instrument, in which the lengths of the transmission lines in the series device calibrator and the shunt device calibrator are equal to the length of the transmission lines in the tested object measuring instrument such that the series device calibrator and the shunt device calibrator have the same error box as the tested object measuring instrument; and after acquiring the scattering parameter matrix of the error box through the calibration method, it is possible to connect a tested electronic device onto the tested object measuring instrument and perform operations on uncorrected measurement data thereof thereby obtaining the radio frequency scattering parameter of the tested object.

4 Claims, 5 Drawing Sheets

CALIBRATION METHOD FOR RADIO FREQUENCY SCATTERING PARAMETER MEASUREMENTS

BACKGROUND OF THE INVENTION

1. Field of the Invention

The present invention relates to a calibration method for radio frequency scattering parameter measurements; in particular, the present invention relates to a calibration method of one-tier radio frequency scattering parameter measurement de-embedding for semiconductor wafer devices or other substrate devices.

2. Description of Related Art

Typically, it is difficult to directly measure the voltage and current of a signal in the radio frequency microwave frequency band, thus in such a frequency band, it is necessary to discuss in the form of wave with actions through incidence, reflection and absorption thereby facilitating measurements of scattering parameters thereof. Because the entire measurement system needs to perform a sequence of complicated processes, the measurement calibration is consequently required in order to improve the accuracy of measurements, in which the measurement error can be mathematically characterized by using an error matrix, and the measurement error can be roughly divided into three major categories; i.e., random, drift and system errors, among which the scattering parameter of the system error can be effectively detected by a network analyzer under a stable measurement environment, further obtaining the error thereof, thus completing the measurement calibration.

In practice, the implementation procedure for such a calibration method is essentially to adjust the initial status of the instrument after startup to a user-defined actual measurement environment so as to eliminate any additional errors other than the tested object; while currently available radio frequency scattering parameter measurement for semiconductor wafer devices typically operates in a two-tier approach, comprising the following steps:

1. performing calibrations on the system before starting the measurement thereby eliminating the effect caused by the measuring instrument and environment; hence it first uses a probe in conjunction with an Impedance Standard Substrate (ISS) for calibration, whose calibration method can be SOLT (Short-Open-Load-Thru) or LRM (Line-Reflect-Match), and then moves the measurement reference plane to the tip of the probe, but a small segment of connection line exists between the probe pad and the tested device within the wafer, and the capacitive effect in the probe pad of large area may not be effectively calibrated;
2. further performing calibrations on the additional dummy structure (e.g., Short, Open, Thru etc.) of the wafer so as to remove the effects caused by the pad and the connection line, i.e., the de-embedding procedure, thus the major purpose of de-embedding is to remove the effect of the test fixture from the measurement data in raw test results so as to acquire the most primitive characterization of the device.

However, such a two-tier measurement approach has the following drawbacks:

1. the high frequency feature of the additional dummy structure on the wafer may not be conveniently appreciated, and in case it is assumed to be an ideal feature, significant errors may be undesirably introduced at high frequency in the de-embedding process;
2. the two-tier measurement consumes much the wafer probe test time, consequently, as applying to massive tests, it becomes comparatively critical;
3. since the Impedance Standard Substrate (ISS) is expensive and the feature thereof may degrade after each test due to scratches on its pad caused by the probe, the substrate needs to be replaced after a certain cycles of use, thus adversely elevating the test cost.

Regarding to the aforementioned drawbacks, a few literatures have proposed certain solutions therefore, including:

1. *IEEE Trans. Electron Devices*, vol. 54, no. 10, pp. 2706-2714, October 2007, describing the use of a one-tier measurement for de-embedding operation at the cost of five dummy structures (Open, Short, Thru, Left, Right), so the precision thereof may be compromised in comparison with the two-tier approach.
2. *IEEE Trans. Microwave Theory Tech.*, vol. 51, pp. 2391-2401, December 2003, describing a Multiline Thru-Reflect-Line (TRL) calibration method developed by NIST (National Institute of Standards and Technology), which enables completion of calibration and de-embedding process in a one-tier fashion, but presents a disadvantage of requirement on multiple transmission line segments which significantly occupies valuable wafer area.

As a result, it would be an optimal solution to provide a calibration method for radio frequency scattering parameter measurements which can perform the de-embedding process in a one-tier radio frequency scattering parameter measurement of semiconductor wafer devices or other substrate devices without using the Impedance Standard Substrate but requiring the resolution of simply three calibrators for operations.

SUMMARY OF THE INVENTION

The objective of the present invention is to provide a calibration method for radio frequency scattering parameter measurements which improves the accuracy of scattering parameter measurements and uses a one-tier measurement for the de-embedding process.

Another objective of the present invention is to provide a calibration method for radio frequency scattering parameter measurements which applies the Line-Series-Shunt calibration method to perform wideband measurements and uses the known conditions offered by the calibrators to solve the same or more number of the unknown variables thereby achieving the objective of self-calibration.

A calibration method for radio frequency scattering parameter measurements enabling self-calibration is herein provided, which calibration method using a transmission line segment calibrator, a series device calibrator, a shunt device calibrator and a tested object measuring instrument, in which the lengths of the transmission lines in the series device calibrator and the shunt device calibrator are equal to the one of the transmission line in the tested object measuring instrument such that the series device calibrator and the shunt device calibrator have the same error box as the tested object measuring instrument, and after acquiring the scattering parameter matrix of the error box through the calibration method, it is possible to connect a tested electronic device onto the tested object measuring instrument and perform operations on uncorrected measurement data thereof thereby obtaining the radio frequency scattering parameter of the tested object.

More specifically, said calibration method for radio frequency scattering parameter measurements can remove the introduced errors during measurements, and characteristics of such errors can be expressed by means of mathematical models, in which, after measurements on the transmission line segment calibrator, series device calibrator and shunt device calibrator, it is possible to input into the mathematical model so as to solve all error parameters by calculations, and through repeated operations, the error value required for calibration can be obtained thereby further acquiring the parameter value of the actual tested object.

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the present invention in conjunction with the appended drawings.

Figure 1A:
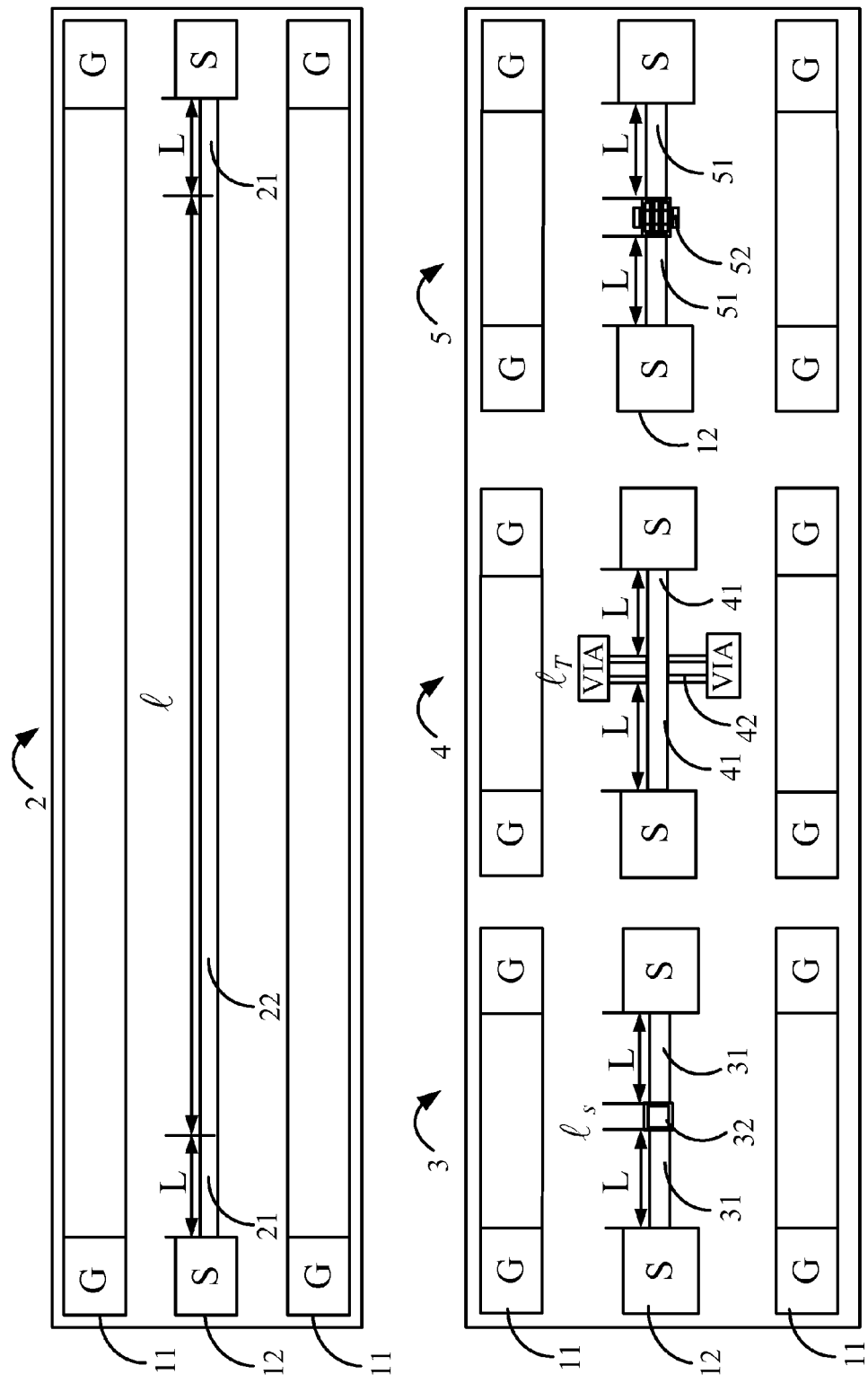
FIG. 1A shows a structure diagram for the microstrip layout of the calibration method for radio frequency scattering parameter measurements according to the present invention.
Figure 1B:
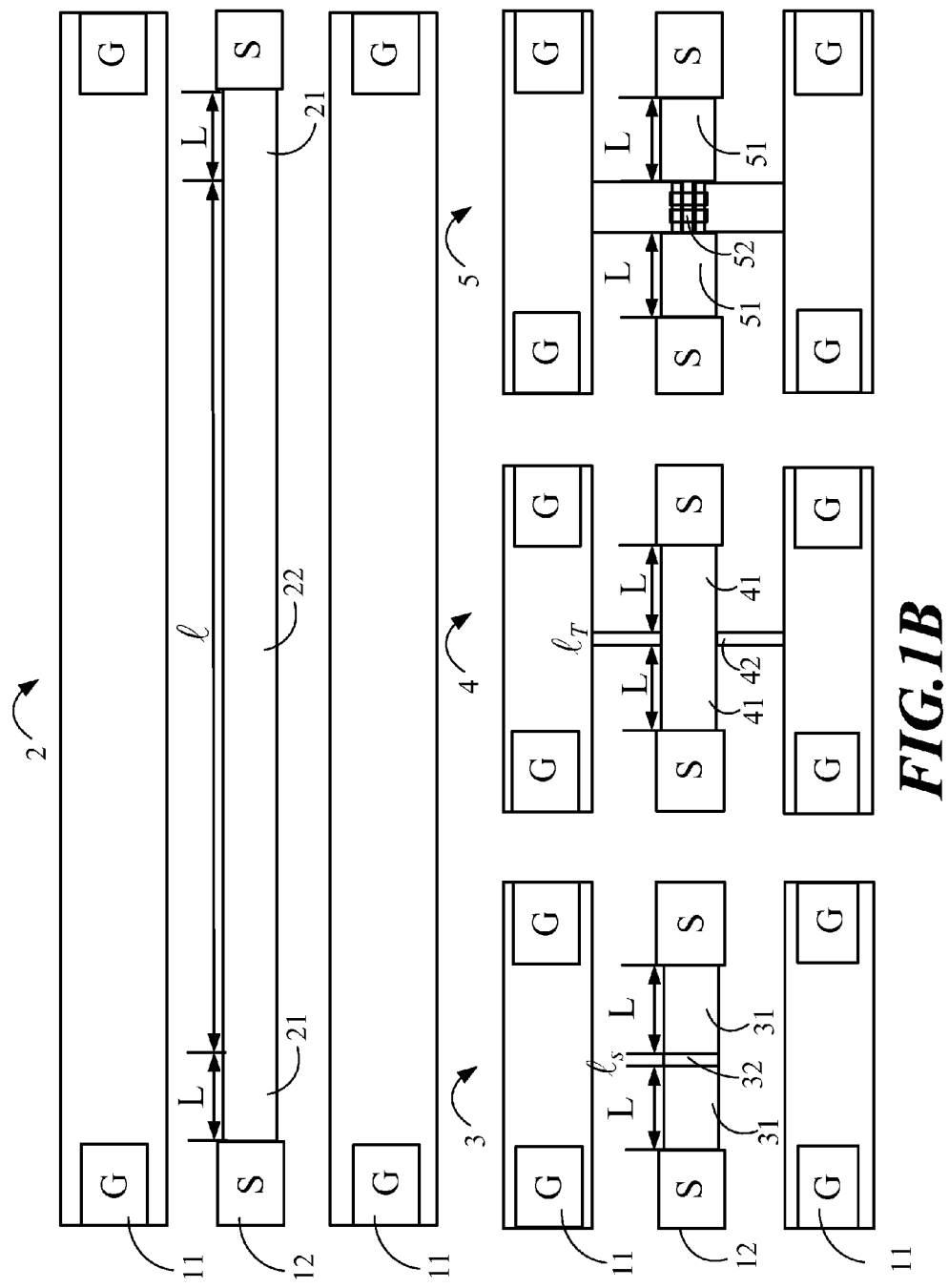
FIG. 1B shows a structure diagram for the coplanar waveguide layout of the calibration method for radio frequency scattering parameter measurements according to the present invention.
Figure 2:
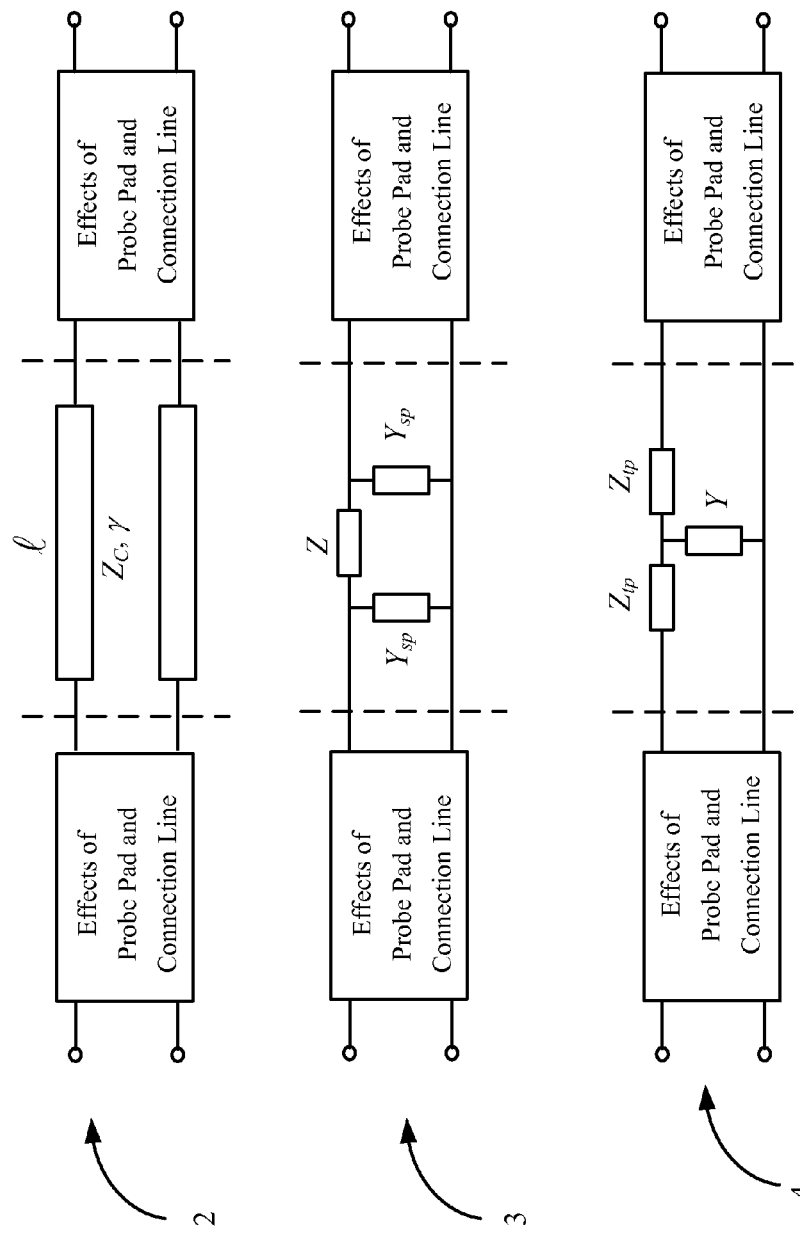
FIG. 2 shows an equivalent circuit diagram for the calibrator in the calibration method for radio frequency scattering parameter measurements according to the present invention.

Refer initially to FIGS. 1A, 1B and 2, wherein a structure diagram for the microstrip layout, a structure diagram for the coplanar waveguide layout and an equivalent circuit diagram for the calibrator of the calibration method for radio frequency scattering parameter measurements according to the present invention are respectively shown, and it can be seen that the measurement structure applied in the calibration method for radio frequency scattering parameter measurements according to the present invention uses a microwave probe as the contact interface for microwave signal transmissions, and the microwave probe includes at least a ground 11 and a signal end 12 (G-S), in which the measurement structure applied in the calibration method for radio frequency scattering parameter measurements comprises:

a transmission line segment calibrator 2, in which the microwave probe (the ground 11 and the signal end 12) contacts the transmission line segment calibrator 2, and the transmission line segment calibrator 2 consists of two transmission lines 21 and a transmission line segment 22, in which the transmission line segment 22 is connected between the two transmission lines 21, and the transmission lines 21 are connected to the signal end 12 of the microwave probe thereby performing measurements on the device characteristics of the transmission line segment 22;

a series device calibrator 3, in which the microwave probe (the ground 11 and the signal end 12) contacts the series device calibrator 3, and the series device calibrator 3 consists of two transmission lines 31 and a series resistor 32, in which the series resistor 32 is connected between the two transmission lines 31 and the two transmission lines 31 are connected to the signal end 12 of the microwave probe thereby performing measurements on the device characteristics of the series resistor 32;

a shunt device calibrator 4, in which the microwave probe (the ground 11 and the signal end 12) contacts the shunt device calibrator 4, and the shunt device calibrator 4 consists of two transmission lines 41 and a shunt resistor 42, in which the shunt resistor 42 is connected between the two transmission lines 41 and the two transmission lines 41 are connected to the signal end 12 of the microwave probe thereby performing measurements on the device characteristics of the shunt resistor 42;

a tested object measuring instrument 5, in which the microwave probe (the ground 11 and the signal end 12) contacts the tested object measuring instrument 5, and the tested object measuring instrument 5 consists of two transmission lines 51 and a tested device 52, in which the tested device 52 is connected between the two transmission lines 51 and the two transmission lines 51 are connected to the signal end 12 of the microwave probe thereby performing measurements on the device characteristics of the tested device 52 (the tested device is shown as an FET device in FIGS. 1A and 1B).

It should be noted that, as shown in FIG. 2, the equation for the equivalent circuit of the series device calibrator 3 (where $y_{sp}$ is a high frequency parasitic effect device) includes:

$$z \equiv \frac{Z}{Z_C}, \ y_{sp} \equiv \frac{Y_{sp}}{Y_C}, \ Y_C \equiv \frac{1}{Z_C},$$

and the equation for the equivalent circuit of the shunt device calibrator 4 (where $z_{tp}$ is a high frequency parasitic effect device) includes:

$$y \equiv \frac{Y}{Y_C}, \ z_{tp} \equiv \frac{Z_{tp}}{Z_C}, \ Y_C \equiv \frac{1}{Z_C}.$$

It should be noted that the transmission lines 21 in the transmission line segment calibrator 2, the transmission lines 31 in the series device calibrator 3, the transmission lines 41 in the shunt device calibrator 4 and the transmission lines 51 in the tested object measuring instrument 5 have the same lengths, such that the series device calibrator 3 and the shunt device calibrator 4 have the identical error box as the tested object measuring instrument 5.

It should be noted that the width of the series resistor 32 is equal to the width of the transmission lines 31 in the series device calibrator 3.

It should be noted that the shunt resistor 42 is connected to the ground 11 through the two sides of the transmission lines 41 in the shunt device calibrator 4.

It should be noted that the transmission line segment calibrator 2, the series device calibrator 3, the shunt device calibrator 4 and the tested object measuring instrument 5 can be disposed on a silicon substrate, a compound semiconductor (GaAs, GaN, InP etc.) substrate or a ceramic/FR-4 (epoxy glass fiber board) substrate.

It should be noted that the transmission line segment calibrator 2, the series device calibrator 3, the shunt device calibrator 4 and the tested object measuring instrument 5 can use the microstrip or the coplanar waveguide as the connection transmission line, as shown in FIG. 1A, wherein the calibrators 2, 3, 4 and the tested object measuring instrument 5 use the microstrip as the connection transmission line; and alternatively, as shown in FIG. 1B, wherein the calibrators 2, 3, 4 and the tested object measuring instrument 5 use the coplanar waveguide as the connection transmission line.

It should be noted that the microwave probe is a high frequency probe and the type thereof can be G-S-G-S-G, G-S-S-G, G-S-G (Ground-Signal-Ground) or G-S (Ground-Signal).

Figure 3:
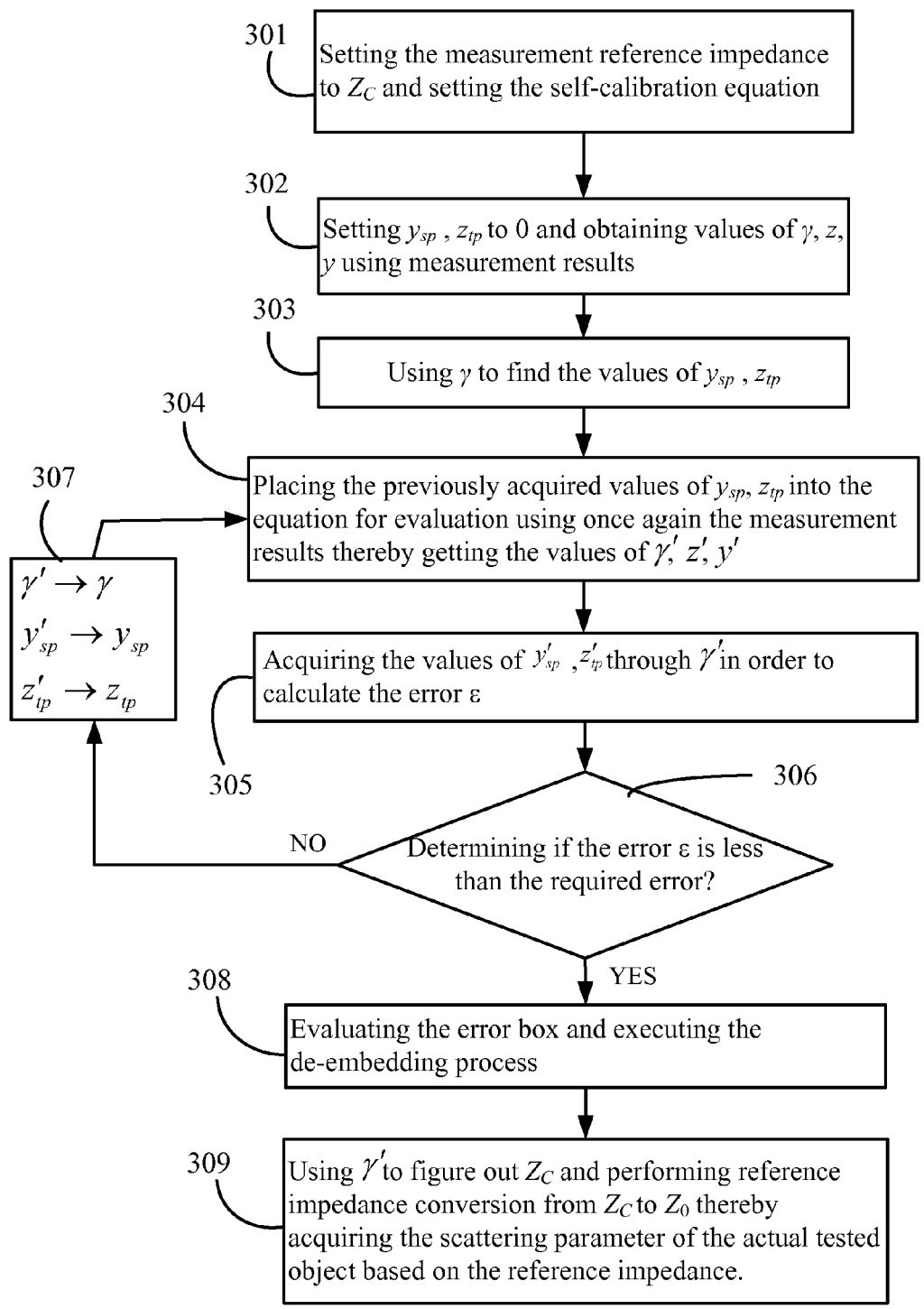
FIG. 3 shows a flowchart for the calibration operation in the calibration method for radio frequency scattering parameter measurements according to the present invention.

Refer next to FIG. 3, wherein an operation flowchart for the calibration in the calibration method for radio frequency scattering parameter measurements according to the present invention is shown, and it can be seen that, from the chart, the calibration method for radio frequency scattering parameter measurements can apply the known conditions provided by the calibrators to solve the same or more number of the unknown variables, in which the calibration flow for the calibration method for radio frequency scattering parameter measurements comprises the following steps:

1. initially, setting the measurement reference impedance of the transmission line to $Z_C$, and setting a self-calibration equation including multiple variables $t(=e^{\gamma l})$, z, y, $z_{tp}$, $y_{sp}$ (301) ($\gamma$ indicates the propagation constant of the transmission line, l the length of the transmission line segment in the transmission line segment calibrator, z the normalized impedance of the series device calibrator, y the normalized admittance of the shunt device calibrator, and $z_{tp}$, $y_{sp}$ the high frequency parasitic effect devices), wherein such a self-calibration equation can be expressed as below:

$$f_1 = \text{trace}\{[K_S][K_T]^{-1}\} = 2 - zy + 2(yz_{tp} + zy_{sp}) + \quad (1)$$
$$2zyz_{tp}y_{sp} - 4z_{tp}y_{sp} - 2(zz_{tp}y_{sp}^2 + yy_{sp}z_{tp}^2) - zy(z_{tp}y_{sp})^2;$$

$$f_2 = \text{trace}\{[K_S][K_L]^{-1}\} = \quad (2)$$
$$\left(1-\frac{z}{2}\right)\cdot t + \left(1+\frac{z}{2}\right)/t + y_{sp}[(z-1)\cdot t + (z+1)/t] - \frac{zy_{sp}^2}{2}(t-1/t);$$

$$f_3 = \text{trace}\{[K_T][K_L]^{-1}\} = \left(1-\frac{y}{2}\right)\cdot t + \left(1+\frac{y}{2}\right)/t +$$
$$z_{tp}[(y-1)\cdot t + (y+1)/t] - \frac{yz_{tp}^2}{2}(t-1/t).$$

2. setting $y_{sp}$, $z_{tp}$ in the self-calibration equation to 0, applying the measurement results from the transmission line segment calibrator, the series device calibrator and the shunt device calibrator in the self-calibration equation (1)~(3) and then using the Newton-Raphson method to allow the equations to converge thereby obtaining the values of $\gamma$, z, y (302);

3. using $\gamma$ to find the values of $y_{sp}$, $z_{tp}$ (303), where the equations for $y_{sp}$, $z_{tp}$ can be respectively expressed as below:

$$y_{sp} = \gamma l_S/2, \quad (4)$$

$$z_{tp} = \gamma l_T/2. \quad (5)$$

4. placing the values of $y_{sp}$, $z_{tp}$ acquired from STEP 3 into the self-calibration equation (1)~(3) conjunctively with the measurement results of the transmission line segment calibrator, the series device calibrator and the shunt device calibrator so as to get the values of $\gamma'$, z', y' (304);

5. after acquiring the values of $y'_{sp}$, $z'_{tp}$ through $\gamma'$, performing operations on the error which can be written as $\epsilon = |y'_{sp} - y_{sp}|/|y_{sp}| + |z'_{tp} - z_{tp}|/|z_{tp}|$ (305);

6. determining that if the error $\epsilon$ is less than the required error (306), then starting evaluation of the error box and execution of de-embedding (308) (the de-embedding process allows to get the scattering parameter of the tested object, and in this case the characteristic impedance of the transmission line acts as the reference impedance); contrarily, suppose the error $\epsilon$ is still greater than the required error, returning to STEP 3 for repeating the aforementioned operations (whereas substituting original $\gamma$ with $\gamma'$, substituting original z with z' and substituting original y with y') (307), until the error $\epsilon$ becomes less than the required error;

7. finally, using $\gamma'$ to figure out $Z_C$ and performing transmission line reference impedance conversion from $Z_C$ to $Z_0$, typically 50$\Omega$, thereby acquiring the scattering parameter of the actual tested object based on the reference impedance of $Z_0$ (309).

Figure 4:
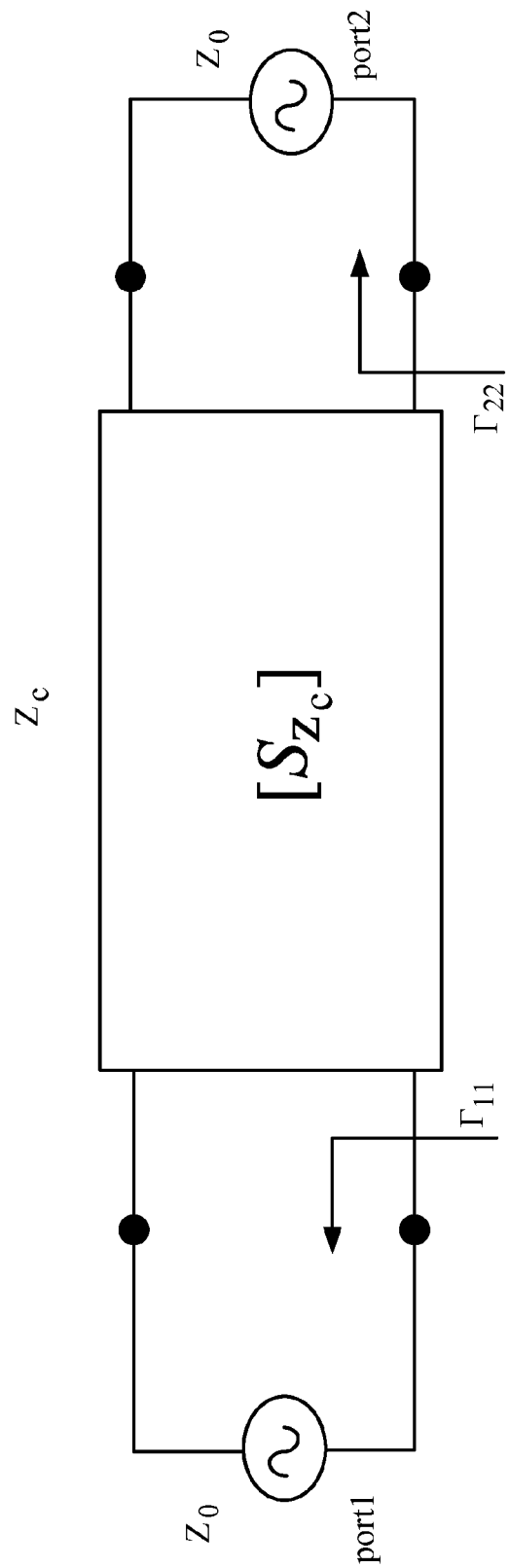
FIG. 4 shows an architecture diagram for the two-port network of integral measurement in the calibration method for radio frequency scattering parameter measurements according to the present invention.

Refer next to FIG. 4, wherein an architecture diagram for the two-port network of integral measurement is shown, and it should be noted that the characteristic impedance of the transmission lines in the network is $Z_C$, the characteristic impedance of the transmission lines for the network analyzer is $Z_0$, and the characteristic impedance can be converted from $Z_C$ to $Z_0$ by means of a conversion relationship equation thus obtaining the scattering parameter of the actual tested object, wherein the conversion relationship equation can be written as below:

$$[D_{Z_0}] = \frac{1}{1-\Gamma^2}\begin{bmatrix} 1 & \Gamma \\ \Gamma & 1 \end{bmatrix} \cdot [D_{Z_C}] \cdot \begin{bmatrix} 1 & -\Gamma \\ -\Gamma & 1 \end{bmatrix}, \quad (6)$$

in which $[D_{Z_0}]$ and $[D_{Z_C}]$ respectively indicates the transmission matrix before and after conversion, with $\Gamma$ defined as:

$$\Gamma = \frac{Z_C - Z_0}{Z_C + Z_0}. \quad (7)$$

It should be noted that [K] appearing in the self-calibration equation represents the transmission matrix of the measurement.

It should be noted that, in STEP 7, if it is required to convert the reference impedance to the conventionally specified 50$\Omega$ (National Institute of Standards and Technology (NIST) has developed the measurement base value of a standard transmission line of 50$\Omega$), then the characteristic impedance of the transmission line is needed so as to get the reference impedance of the transmission line through the following equation by using the direct current resistance measurement value in the shunt device calibrator, thus finally acquiring the scattering parameter of the actual tested object with the reference impedance of 50$\Omega$.

$$Z_C = \gamma/(j2\pi fC) \quad (8)$$

$$C = \text{Re}\left\{-\frac{(1-S_{11})\gamma}{j4\pi f S_{11} R_{dc,shunt}}\right\}\bigg|_{f<1\,GHz} \quad (9)$$

It should be noted that the present invention can apply the direct current resistance measurement values of the series device calibrator and the shunt device calibrator to obtain the propagation constant of the transmission line in order to address the issues concerning ill-conditioned problem in self-calibration at low frequencies; meanwhile, the high frequency parasitic effect elements $y_{sp}$, $z_{tp}$ in the series device calibrator and the shunt device calibrator can be employed to resolve the ill-conditioned problem in self-calibration as the LINE phase shift approaching to 180° and integral multiplications thereof, thereby achieving the effect of wideband calibration measurement.

Compared with prior art, the calibration method for radio frequency scattering parameter measurements provided by the present invention can offer the following advantages:
1. the present invention enables improvement in accuracy of scattering parameter measurements and execution of de-embedding process in the one-tier measurement of radio frequency scattering parameter for semiconductor wafer devices or other substrate devices;
2. the present invention can provide a Line-Series-Shunt calibration method to perform wideband measurements and also use the known conditions offered by the calibrators to solve the same or more number of unknown variables thereby achieving the objective of self-calibration;
3. the calibration method according to the present invention features convenience in fabrication and simplicity, so it is not required to apply expensive materials, but only exploit the characteristics of series and shunt resistor connections for calibrating to a sufficient frequency bandwidth, and all characteristic parameters can be obtained though the self-calibration process as well.

By way of the aforementioned detailed descriptions for the preferred embodiments according to the present invention, it is intended to better illustrate the characters and spirit of the present invention rather than restricting the scope of the present invention to the preferred embodiments disclosed in the previous texts; contrarily, the objective is to encompass all changes and effectively equivalent arrangements within the scope of the present invention as delineated in the following claims of the present application.

What is claimed is:

1. A calibration method for radio frequency scattering parameter measurements applying three calibrators, a tested object measuring instrument and equations of five variables, the three calibrators are respectively a transmission line segment calibrator, a series device calibrator and a shunt device calibrator; the three calibrators and the tested object measuring instrument have the identical error boxes; the scattering parameter matrix of the error box is obtained by the calibration method such that, after connecting a tested electronic device onto the tested object measuring instrument, performing operations on uncorrected measurement data thereby obtaining the radio frequency scattering parameter of the tested object.

2. The calibration method for radio frequency scattering parameter measurements according to claim 1, lengths of interconnection transmission lines in the series device calibrator and in the shunt device calibrator are equal to a length of interconnection transmission line in the tested object measuring instrument such that the series device calibrator, the shunt device calibrator and the tested object measuring instrument have the identical error box.

3. A calibration method for radio frequency scattering parameter measurements, comprising:
(1) setting the measurement reference impedance of the transmission line to $Z_C$, and setting a self-calibration equation including the variables $t(=e^{\gamma l}), z, y, z_{tp}, y_{sp}$;
(2) setting $y_{sp}, z_{tp}$ in the self-calibration equation to 0, and then obtaining the values of $\gamma, z, y$;
(3) using $\gamma$ to find the values of $y_{sp}, z_{tp}$;
(4) placing the values of $y_{sp}, z_{tp}$ acquired from STEP 3 into the self-calibration equation conjunctively with the measurement results of the transmission line segment calibrator, the series device calibrator and the shunt device calibrator so as to get the values of $\gamma', z', y'$;
(5) after acquiring the values of $y'_{sp}, z'_{tp}$ through $\gamma'$, performing operations on the error $\epsilon$;
(6) determining that if the error $\epsilon$ is less than the required error, then starting evaluation of the error box and execution of de-embedding process; contrarily, if the error $\epsilon$ is still greater than the required error, returning to STEP 3 for repeating the operations until the error $\epsilon$ becomes less than the required error;
(7) using $\gamma'$ to figure out $Z_C$ and performing transmission line reference impedance conversion from $Z_C$ to $Z_0$ thereby acquiring the scattering parameter of the actual tested object based on the reference impedance of $Z_0$;
the equation for $y_{sp}$ is $\gamma l_s/2$;
the equation for $z_{tp}$ is $\gamma l_T/2$; and
the equation for $\epsilon$ is $|y'_{sp} - y_{sp}|/|y_{sp}| + |z'_{tp} - z_{tp}|/|z_{tp}|$.

4. The calibration method for radio frequency scattering parameter measurements according to claim 3, wherein the self-calibration equation includes $f_1$, $f_2$ and $f_3$ respectively expressed as:

$$f_1 = \text{trace}\{[K_S][K_T]^{-1}\} = 2 - zy + 2(yz_{tp} + zy_{sp}) + 2zyz_{tp}y_{sp} - 4z_{tp}y_{sp} - 2(zz_{tp}y_{sp}^2 + yy_{sp}z_{tp}^2) - zy(z_{tp}y_{sp})^2;$$

$$f_2 = \text{trace}\{[K_S][K_L]^{-1}\} =$$
$$\left(1 - \frac{z}{2}\right) \cdot t + \left(1 + \frac{z}{2}\right)/t + y_{sp}[(z-1) \cdot t + (z+1)/t] - \frac{zy_{sp}^2}{2}(t - 1/t); \text{ and}$$

$$f_3 = \text{trace}\{[K_T][K_L]^{-1}\} =$$
$$\left(1 - \frac{y}{2}\right) \cdot t + \left(1 + \frac{y}{2}\right)/t + z_{tp}[(y-1) \cdot t + (y+1)/t] - \frac{yz_{tp}^2}{2}(t - 1/t).$$

* * * * *